United States Patent [19]

Feller et al.

[11] Patent Number: 4,983,551

[45] Date of Patent: Jan. 8, 1991

[54] CHANNEL ELECTRON MULTIPLIERS

[75] Inventors: W. Bruce Feller, Sturbridge; Lee M. Cook, Spencer, both of Mass.

[73] Assignee: Galileo Electro-Optics Corp., Sturbridge, Mass.

[21] Appl. No.: 234,325

[22] Filed: Aug. 18, 1988

[51] Int. Cl.$^5$ ................................................ C03C 3/07
[52] U.S. Cl. ............................................................ 501/74
[58] Field of Search ............................................... 501/74

[56] References Cited

U.S. PATENT DOCUMENTS

| 2,736,714 | 2/1956 | Tiede | 501/74 |
| 3,445,256 | 5/1969 | Dalton | 501/74 |
| 4,365,150 | 12/1982 | Bateman | 250/207 |
| 4,721,690 | 1/1988 | Ross et al. | 501/74 |

FOREIGN PATENT DOCUMENTS 2120232 11/1983 United Kingdom .

Primary Examiner—Mark L. Bell

[57] ABSTRACT

Glass consisting essentially of, in weight percent:

| $SiO_2$ | 30–35% |
| $PbO$ | 50–57% |
| $Cs_2O$ | 2–10% |
| $\Sigma MgO + CaO + SrO + BaO$ | 0–5% |
| $\Sigma Al_2O_3 + ZrO_2 + TiO_2 + Nb_2O_5$ | 0.1–1%, | wherein the ratio of Si or Pb, expressed as the molar ratio of $SiO_2$ to $PbO$, is 2.0–2.4, and channel electron multipliers made therefrom.

2 Claims, No Drawings

CHANNEL ELECTRON MULTIPLIERS

FIELD OF THE INVENTION

This invention relates to channel electron mutlipliers, and more particularly to a new glass useful in microchannel plates.

BACKGROUND OF THE INVENTION

It has been taught that presence in microchannel plate glass of "alkali elements with substantial radio isotope content (e.g., potassium oxide...and rubidium oxide . . . )" may cause undesirable noise (Loretz U.K. Patent Application GB 2 120 232 A, published Nov. 30, 1983). Loretz there taught this formulation free of potassium and rubidium:

| Composition (mol Percent of Oxide) | |
| --- | --- |
| $SiO_2$ | 68.00 |
| PbO | 24.00 |
| Alkali | |
| $Li_2O$ | 1.60 |
| $Na_2O$ | 2.80 |
| $K_2O$ | — |
| $Rb_2O$ | — |
| $Cs_2O$ | 0.30 |
| Alkaline Earth | |
| SrO | 3.00 |
| BaO | — |
| $As_2O_3$ | 0.06 |
| $Bi_2O_3$ | 0.04 |
| $Al_2O_3$ | 0.30 |

It was asserted in Bateman U.S. Pat. No. 4,365,150, "Gain Stabilized Microchannel Plates and MCP Treatment Method", Dec. 21, 1982, that providing a cesium oxide film on channel walls improved gain and life. Bateman said also (col. 3, lines 33-37):

Results equivalent to that of the solution evaporation method can be achieved by incorporating the cesium in the raw glass used to fabricate the microchannel plate, suitably as a replacement for a portion of the potassium content.

Glass of the formula of the invention, except that it included in its ingredients several percent by weight of rubidium oxide, was in public use more than a year ago.

SUMMARY OF THE INVENTION

We have discovered that low-noise channel electron multipliers, and in particular microchannel plates, may desirably be made of our new glass, which consists essentially of, in weight percent:

| | |
| --- | --- |
| $SiO_2$ | 30–35% |
| PbO | 50–57% |
| $Cs_2O$ | 2–10% |
| $\Sigma MgO + CaO + SrO + BaO$ | 0–5% |
| $\Sigma Al_2O_3 + ZrO_2 + TiO_2 + Nb_2O_5$ | 0.1–1% | wherein the ratio of Si to Pb, expressed as the molar ratio of $SiO_2$ to PbO, is 2.0–2.4.

In preferred embodiments, the only alkali oxide included in the formulation is $Cs_2O$.

PREFERRED EMBODIMENT

A presently preferred embodiment of the glass invention is as follows:

| Oxide | Raw Mtl. | Weight % | Compound Weight (kg) |
| --- | --- | --- | --- |
| $SiO_2$ | $SiO_2$ | 34.25 | 6.87 kg. |
| PbO | $Pb_3O_4$ | 54.06 | 11.04 kg. |
| $Cs_2O$ | $CsCO_3$ | 7.56 | 1.75 kg. |
| BaO | $Ba(CO_3)_2$ | 3.94 | 1.03 kg. |
| $Al_2O_3$ | $Al(OH)_3$ | 0.19 | 0.06 kg. |
| $As_2O_3$ | $As_2O_3$ | 0.10 | 0.02 kg. |

Microchannel plates fabricated by techniques, including of course a reduction step, are well known in the art, exhibited not only diminished dark noise, but also extremely good strip current and electron gain.

Use of this formulation in channel electron multipliers permits elimination of potassium and rubidium while nevertheless achieving outstanding fabrication and performance characteristics.

Although oxide weights and mol percents are set forth herein, as is well understood in the art other compounds of the various metal elements may be substituted.

This invention was made with Government support under contract number NAS1-18482. The Government has certain rights in this invention.

What is claimed is:

1. Glass consisting essentially of, in weight percent:

| | |
| --- | --- |
| $SiO_2$ | 30–35% |
| PbO | 50–57% |
| $Cs_2O$ | 2–10% |
| $\Sigma MgO + CaO + SrO + BaO$ | 0–5% |
| $\Sigma Al_2O_3 + ZrO_2 + TiO_2 + Nb_2O_5$ | 0.1–1%, | wherein the ratio of Si to Pb, expressed as the molar ratio of $SiO_2$ to PbO, is 2.0–2.4.

2. Glass consisting essentially of, by weight percent:

| | |
| --- | --- |
| $SiO_2$ | 34.25 |
| PbO | 54.06 |
| $Cs_2O$ | 7.56 |
| BaO | 3.94 |
| $Al_2O_3$ | 0.19. |

* * * * *